US008299409B2

(12) United States Patent
Harihara et al.

(10) Patent No.: US 8,299,409 B2
(45) Date of Patent: Oct. 30, 2012

(54) FUZZY LOGIC-BASED CONTROL OF MICROWAVE DRYERS

(75) Inventors: Parasuram Padmanabhan Harihara, Painted Post, NY (US); Brett Alan Terwilliger, Corning, NY (US)

(73) Assignee: Corning Incorporated, Corning, NY (US)

( * ) Notice: Subject to any disclaimer, the term of this patent is extended or adjusted under 35 U.S.C. 154(b) by 526 days.

(21) Appl. No.: 12/609,646

(22) Filed: Oct. 30, 2009

(65) Prior Publication Data

US 2010/0108667 A1 May 6, 2010

Related U.S. Application Data

(60) Provisional application No. 61/110,293, filed on Oct. 31, 2008.

(51) Int. Cl.
*H05B 6/68* (2006.01)
*G06N 7/02* (2006.01)

(52) U.S. Cl. ............. 219/704; 219/702; 706/52; 706/47

(58) Field of Classification Search .................. 219/704, 219/702; 706/52, 47
See application file for complete search history.

(56) References Cited

U.S. PATENT DOCUMENTS 5,596,179 A * 1/1997 Sakaeda ..................... 177/25.18
6,446,357 B2 * 9/2002 Woerdehoff et al. ........... 34/491
7,087,874 B2 * 8/2006 Ishikawa et al. .............. 219/701
7,729,510 B2 * 6/2010 Zakrzewski et al. .......... 382/100

OTHER PUBLICATIONS

Tayel, M., et al., "A fuzzy logic controller for a dry rotary cement kiln", IEEE, 1997, pp. 1525-1531.
Islam, Md, R., et al., "Microprocessor based temperature monitoring and control system using fuzzy logic controller", 5th International Conference on Electrical and Computer Engineering, , Dec. 20-22, 2008, pp. 878-882.
Gao, Z., et al., "A stable self-tuning fuzzy logic control system for industrial temperature regulation", 2000 IEEE, pp. 1232-1240.
Wilkinson, J., "Additional advances in fuzzy logic temperature control", 1995 IEEE, pp. 2721-2725.
Mota, A.M., et al., "An adaptive control system for an industrial tunnel kiln", 1993 IEEE, pp. 102-104.
Babary, J.P., "Modelling and adaptive open loop control of tunnel kilns", Proceedings of the 24th Conference on Decision and Control, Ft. Lauderdale, FL, Dec. 1985, 1985 IEEE, pp. 1168-1171.

* cited by examiner

*Primary Examiner* — Tom Thomas
*Assistant Examiner* — Benjamin Tzu-Hung Liu
(74) *Attorney, Agent, or Firm* — Matthew J. Mason

(57) ABSTRACT

A fuzzy logic-based system and method for controlling the drying of material by a microwave applicator. The system includes power output controller that controls applicator output power; material sensor that detects amount of material in the applicator; and fuzzy logic controller that receives a signal from the material sensor indicating the current amount of material in the applicator and adjusts the microwave output power based on the current amount of material in accordance with fuzzy logic rules by sending a control signal to the power output controller. A membership function divides the expected range for the amount of material into multiple regions, each region having precomputed regional output settings. The regional output settings of the regions that include the current amount of material are used to compute the control signal.

14 Claims, 7 Drawing Sheets

FUZZY LOGIC-BASED CONTROL OF MICROWAVE DRYERS

CROSS REFERENCE TO RELATED APPLICATION

This application claims the benefit of priority to U.S. Provisional Application No. 61/110,293, filed on Oct. 31, 2008.

BACKGROUND

The present disclosure generally relates to control systems, and more particularly to control systems for controlling the power and heating/drying rate of microwave dryers.

Conventional heating or drying typically comprising convection, or a combination of convection and radiative gas or electric resistance heating, was commonly used in the manufacturing of ceramic materials. However, the slow heating rate and poor temperature control associated with these conventional heating methods results in a high energy consumption and inconsistent product quality. Furthermore, utilization of these two modes of heating typically result in thermal differences within the ceramic body, due to the fact that these two heating modes are applied only to the surface and rely on thermal conductivity of the ceramic body to effect the temperature beneath the surface to the center of the piece.

Industrial heating by microwave radiation has been successfully used to accelerate the drying of traditional ceramics. In comparison with convection heating, microwave heating provides a higher heating rate, where there is sufficient absorption, with better temperature control, and thus results in lower energy consumption and potentially better quality products. Furthermore, the utilization of microwave energy can deliver a uniform application of the energy to the ceramic article, rather than to the article surface, as is the case for the aforementioned convection and radiative modes of heating. Lastly, microwave heating is much faster than conventional drying.

Although microwave heating is faster and more efficient than conventional modes such as convection and radiative heating, standard microwave heating typically involves controlling the amount of microwave energy utilizing a constant power setpoint to determine the amount of microwave energy to apply to the ceramic body. Typically, this power output is set at some value that ensures that the reflected power never exceeds the manufacturer's specification; i.e., a power output assuming a constant load and material dielectric characteristics. This conventional method of controlling microwave heating does not account for variations in the amount of mass of material in the microwave dryer (loading), or variations in the dielectric characteristics of the load, or variations in geometries and densities of the load. As a result, the microwave heating can be inefficient because the power input at various times during heating is not properly adjusted.

Microwave drying is a drying process that can be employed in ceramic filter and substrate production lines. In ceramic filter production lines, ceramic logs can be passed through dryers and applicators that use microwave energy to dry the ceramic logs or wares. If the drying of the logs is not uniform, then the logs can have defects such as grooves, cracks, end flares, hot logs or cold logs, etc. Prior to each applicator, at the end of each dryer, and/or at the end of the drying process, the temperatures of the logs can be measured using a pyrometer to determine the extent to which the ceramic logs have been dried. Logs that are too hot after the dryers can release organics prior to the firing process which may be detrimental to the final log quality. Logs that are too cold after the dryers, may still contain wet regions that prevent further processing, particularly through the subsequent cutting process, and may also be detrimental to the final log quality.

While the abovementioned techniques have proven useful, developing improved fabrication and control techniques with improvement in performance over existing technology is desirable.

SUMMARY

The current application discloses a fuzzy logic-based control system that is generic in nature and is designed to not only minimize the number of hot or cold wares produced at the end of the drying process, but also to reduce the ware temperature variation for all dryer loading conditions. This can improve the existing control strategy by accounting for the ware temperature differences observed between products of different weights when utilizing the control system. By expanding on the use of log weight to compute the required power changes, the system is able to perform in a similar fashion over a wide range of logs or products, and log or product sizes.

Reduction in the temperature variation of the extruded ceramic ware and in the number of hot and cold wares produced at the end of the microwave drying process will increase the number of acceptable wares, also called product selects. Less temperature variability helps ensure uniform dryness of the wares which is beneficial to the subsequent processes such as firing and also increases the throughput of the production processes. Less hot or cold wares results in increased product selects and improves the material utilization.

The application discloses a system for controlling the drying of material by a microwave applicator that includes a power output controller, a material sensor and a fuzzy logic controller. The power output controller controls the microwave output power of the applicator, the material sensor detects the amount of material in the applicator, and the fuzzy logic controller is connected to the material sensor and the power output controller. The fuzzy logic controller receives a sensor signal from the material sensor indicating the current amount of material in the applicator and adjusts the microwave output power based on the current amount of material in accordance with fuzzy logic rules by sending a control signal to the power output controller.

The material sensor can include a photoeye positioned prior to the entrance of the applicator that detects at least one dimension of the material entering the applicator. The material sensor can also include a weight sensor that detects the weight of the material entering the applicator.

The fuzzy logic controller can include a storage module, a fuzzification module and a selection module. The storage module can store fuzzy logic information, for example a minimum expected value and a maximum expected value for the amount of the material in the applicator which defines an expected range for the amount of material in the applicator. The fuzzification module can hold a membership function that divides the expected range for the amount of material in the applicator into multiple regions, where each region of the membership function has a minimum regional value, a maximum regional value and precomputed regional output settings. The selection module selects each region of the membership function that includes the current amount of material in the range between the minimum regional value and the maximum regional value for that region. The membership function can have overlapping or non-overlapping regions.

The fuzzy logic controller can also include an output processor that computes the control signal based on the precomputed regional output settings of each of the regions of the membership function selected by the selection module. The output processor can include a defuzzification module that computes a minimum output power value based on the precomputed regional output settings. The minimum output power value and a preselected maximum output power value can then be used to calculate the control signal based on the current amount of material in the applicator.

The specification also discloses a fuzzy logic-based method of controlling the drying of material by a microwave applicator. The method can include predetermining an expected minimum amount of material in the applicator and an expected maximum amount of material in the applicator to define an expected range for the amount of material in the applicator, and then dividing the expected range into multiple regions using a membership function. Regional output settings can be precomputed for each of the multiple regions of the membership function. The method can further include determining a current amount of material in the applicator; determining the regions of the membership function that include the current amount of material, and determining the current output settings based on the regional output settings for each of the regions of the membership function that include the current amount of material in the applicator. The method can also include computing a desired output power for the applicator based on the current output settings; and sending a control signal to the microwave controller of the applicator with the desired output power.

The determining a current amount of material step can include sensing a dimension of the material entering the applicator using a dimension sensor positioned prior to the entrance of the applicator; and determining a current amount of material in the applicator based on the sensed dimension of the material entering the applicator. Alternatively or in addition, the determining a current amount of material step can include sensing the weight of the material entering the applicator using a weight sensor; and determining a current amount of material in the applicator based on the weight of the material entering the applicator.

The precomputing regional output settings for each of the multiple regions of the membership function step can include precomputing a minimum power setpoint for the applicator for each region of the membership function based on the range of the amount of material covered by that region of the membership function. This can include precomputing a weight-to-power-difference function relating the weight of the material to a power difference needed to overcome a temperature difference due to a variation in the amount of the material in the microwave applicator; and determining the minimum power setpoint using the weight-to-power-difference function.

The computing a desired output power for the applicator based on the current output settings can include computing a set of polynomial coefficients based on the minimum power setpoint for the applicator and a preselected maximum power setpoint for the applicator; and calculating the desired output power of the applicator using the set of polynomial coefficients. The calculating the desired output power of the applicator using the set of polynomial coefficients step can include calculating an independent variable based on the difference between the expected maximum amount of material in the applicator and the current amount of material in the applicator; and calculating the desired output power of the applicator using the independent variable with the set of polynomial coefficients.

The application further discloses a fuzzy logic-based method of controlling the drying of material by a microwave applicator that includes predetermining a maximum power setpoint for the applicator, and an expected range for the amount of material in the applicator. The method also includes creating a membership function that divides the expected range for the amount of the material into a plurality of regions, and precomputing a regional minimum power setpoint for each of the plurality of regions of the membership function. The method also includes determining a current amount of material in the applicator, and determining the regions of the plurality of regions of the membership function that include the current amount of material in the applicator. An output minimum power setpoint can be determined based on the regional minimum power setpoint for each of the plurality of regions of the membership function that include the current amount of material in the applicator. A desired output power for the applicator can be computed based on the output minimum power setpoint and the maximum power setpoint; and a control signal sent to the microwave controller of the applicator with the desired output power.

The precomputing a regional minimum power setpoint for each of the plurality of regions of the membership function can include precomputing a material-to-power-difference function relating the amount of material in the applicator to a power difference needed to overcome a temperature difference due to a variation in the amount of material in the microwave applicator; and determining the regional minimum power setpoint for each of the plurality of regions of the membership function using the material-to-power-difference function. The material-to-power-difference function can include a plurality of functions covering ranges where the amount of material in the applicator is less than or equal to the expected maximum amount of material in the applicator.

In some embodiments, the material-to-power-difference function can include a first function covering a range where the amount of material in the applicator is less than half of the expected maximum amount of material in the applicator; and a second function covering a range where the amount of material in the applicator is greater than half of the expected maximum amount of material in the applicator.

The computing a desired output power for the applicator step can include computing a set of polynomial coefficients based on the output minimum power setpoint and the maximum power setpoint for the applicator; and calculating the desired output power of the applicator using the set of polynomial coefficients. The calculation of the desired output power of the applicator can include calculating an independent variable based on the difference between the expected maximum amount of material in the applicator and the current amount of material in the applicator; and calculating the desired output power of the applicator using the independent variable with the set of polynomial coefficients.

We have found that if the spacing between two consecutive trays or the spacing between the material in two consecutive trays varies from the nominal tray spacing, then known control strategies often result in the production of either too hot or too cold wares depending on the extent of the variation in the tray spacing. This can adversely affect the number of selects and the resulting production throughput. The performance of the control scheme also varies depending on the weight of the logs being extruded. The present disclosure can provide an efficient control scheme not only for uniform drying of ceramic-forming logs, but also for reducing the number of hot and cold logs that are produced at the end of the drying process.

Additional features and advantages of the invention will become apparent to those skilled in the art upon consideration of the following detailed description of illustrated embodiments.

BRIEF DESCRIPTION OF THE FIGURES

Aspects of the present invention are more particularly described below with reference to the following figures, which illustrate exemplary embodiments of the present invention.

DETAILED DESCRIPTION OF EXEMPLARY EMBODIMENTS

Figure 1:
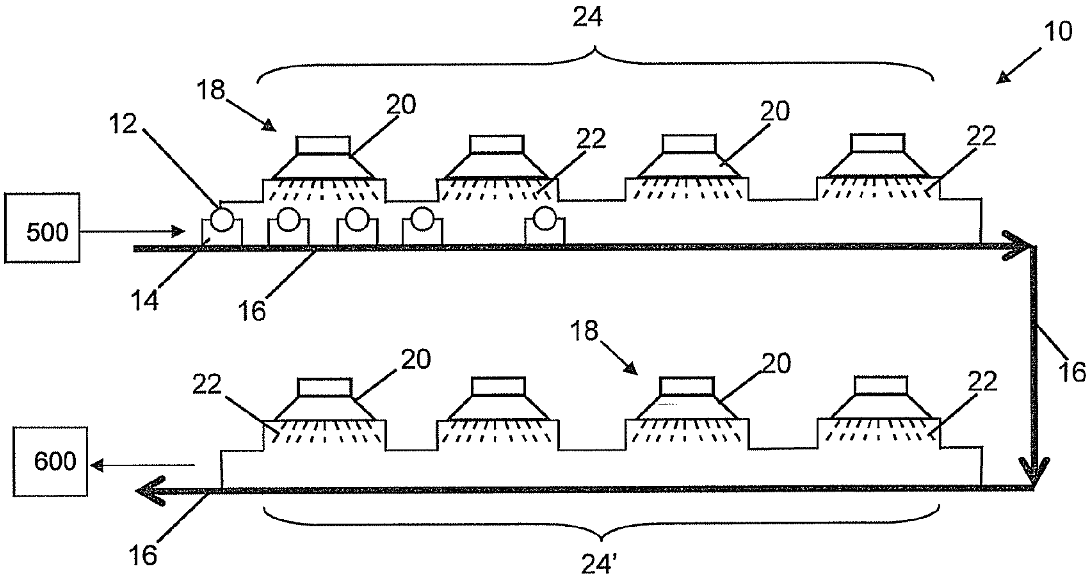
FIG. 1 illustrates an embodiment of a drying configuration.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 provides an example of a schematic of a drying configuration which includes a series of eight microwave applicators 20 divided into two dryers, a primary dryer 24 and a secondary dryer 24'. In this example, a set of four applicators 20 is collectively referred to as a single dryer 24. Ceramic logs 12 from the extruder 500 are passed in trays 14 along a conveyor belt 16 through the series of microwave applicators 20 before proceeding to further processing 600, such as a saw for cutting. Each applicator 20 in a particular dryer 24 is equipped with its own power control to control the amount of microwave energy 22 emitted by the applicator 20. The logs 12 are placed on trays 14 and the trays 14 are carried into the dryers 24 on the conveyor belts 16. Note that there is no particular limitation as to the type of the transport system used. Hence it should be understood that the transport system may comprise any suitable system for conveying ceramic bodies through the microwave applicators. In the example shown in FIG. 1, a conveyor belt is used as the transport system. The spacing between two consecutive trays 14 or the spacing between the material in two consecutive trays is not constant, leading to non-uniform loading conditions. The spacing is dependent on various factors such as, extrusion velocity, timing effects from manual log pushing and equipment timers, log quality at the extrusion exit, etc. The drying configuration is not limited to the schematic shown in FIG. 1. The principles disclosed herein could be used for any combination of microwave applicators designed to dry ceramic bodies.

A photocell installed prior to the entrance of each applicator 20 can be used to determine the amount of material 14 in the applicator 20 for every increment of travel by the belt 16. The amount of material information along with the weight of the extrudate and other variables can be used as inputs to the fuzzy logic-based control system to compute the desired microwave output power 22 of the applicators 20.

Figure 2:
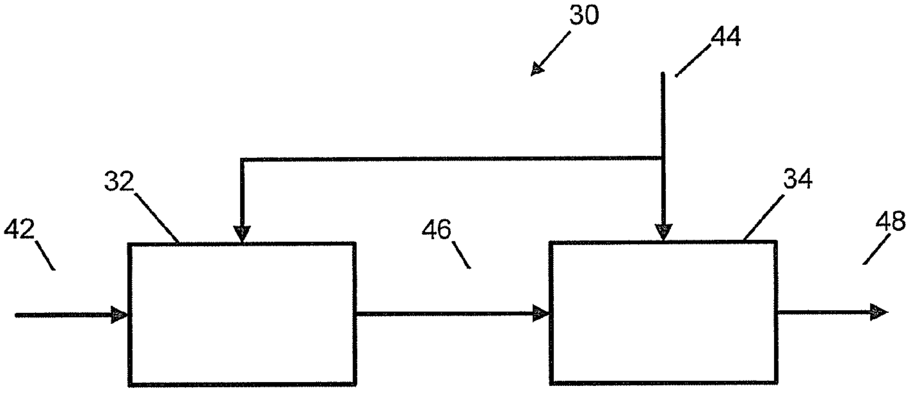
FIG. 2 is a schematic of a fuzzy logic-based control system.

FIG. 2 shows a high-level schematic of a feed-forward control system 30. The feed-forward control system 30 includes a fuzzy logic-based controller 32 and a process system 34. A set point parameter 42 is input to the fuzzy logic-based controller 32 which computes an input parameter 46 that is sent to the process system 34. The process system 34 then produces an output 48. When a disturbance 44 in the process system 34 is monitored, the monitored disturbance 44 is also input to the fuzzy logic-based controller 32 which accounts for the monitored disturbance 44 and calculates the input 46 to the process system 34 that negates the effect of the disturbance 44 when it acts on the process system 34.

In the embodiment shown in FIG. 1, the process systems 34 under consideration can be each of the microwave applicators 20. The disturbance signal can be the variation in the spacing between two adjacent trays 14 or the spacing between the material in two adjacent trays and changes in the weight of the logs 12. The set point input to the fuzzy logic-based controller 32 can be the set point for the microwave output power 22 of the applicator 20. The input computed by the fuzzy logic-based controller 32 and sent to the process system 34 can be the desired microwave output power for the applicator 20. The output of the process system 34 can be the temperature of the logs 12 at the end of the drying process.

In one embodiment, the fuzzy logic-based control system 30 computes the output power of an applicator 20 by taking into account the weight of the logs 12 and the disturbances that occur in the system 34. In this case, the disturbances to the system 34 are spacing disturbances, for example the differences in spacing between the trays 14, or spacing between the material in two adjacent trays, from the nominal tray spacing value or the nominal material spacing value, respectively. This spacing disturbance is computed using a measurement of the width of the trays 14 (for a tray spacing value) or the width of the material (for a material spacing value) in the applicator 20 for every increment of travel by the conveyor belt 16. If the spacing between two consecutive trays 14 or spacing between the material in two adjacent trays is uniform, then the resulting log temperature variability is minimized. However, in operation the spacing between trays or material in the trays varies depending on numerous factors, which makes the amount of material 14 inside an applicator 20 vary with time.

The steps used to design a fuzzy logic-based control scheme 30 are the fuzzification step, which includes identification of the relevant inputs and outputs, classification of the inputs into fuzzy sets and defining membership functions to describe the classification, the rule-base steps, which includes defining a set of control rules which characterizes the desired control goals, the inference step, which computes the output of each of the above defined rules and the defuzzification step, which converts the output of the inference step into a signal that can be used to control the process. For the drying system of FIG. 1, the input variables can be the amount of material inside an applicator 20 and the weight of the ceramic logs 12, and the output variable can be the microwave power setting.

The range of each of the input and output variables should be determined. The amount of material (that also includes the fractional number of logs) inside an applicator 20 can range from 0 (no logs inside the applicator) to a maximum value. The maximum expected amount of material inside the applicator can be a function of applicator length, tray width, extrusion feed rate, log weight, and/or dryer belt speed.

The range of the weights of the extrudate logs 12 typically varies from about 20 pounds to about 90 pounds, but the weight of the extrudate is not limited.

The range of the output microwave power of an applicator 20 varies between a minimum power setpoint and a maximum power setpoint. The minimum and maximum power setpoints can be set independent of the input variables or as a function of the input variables. The maximum power setpoint, $P_{MAX}$, can be a fixed value set by the operator based on the various factors, including product being extruded, desired drying characteristics and the operating parameters of the applicator 20. Different maximum power setpoint values can be used for different circumstances, including different products and different applicators.

Figure 5:
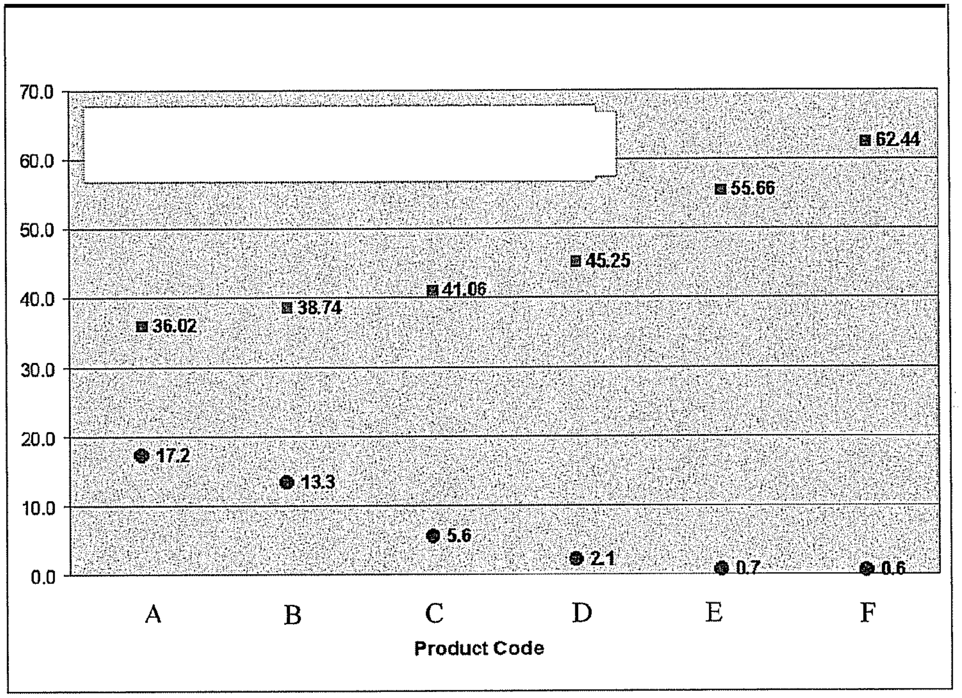
FIG. 5 is a graph showing the temperature drop and weights for several different products when tray spacing gaps are larger than the applicator length.

The minimum power setpoint can be computed as a function of a percent amount of material and the weight of the log 12 being extruded. The percent amount of material is a ratio of the amount of material in the applicator 20 to the maximum expected amount of material in the applicator 20. This function for the minimum power setpoint can be obtained based on historical data as shown in FIG. 5. In the prior control method, the minimum power setpoint is maintained constant throughout.

The amount of material in the applicator 20 can be measured using a photoeye that is placed prior to the entrance of each applicator 20. The logs 12 are placed in trays 14 and the photoeye measures the width of the tray 14 entering the applicator. This tray inches measurement along with the width of the tray 14 provides a value corresponding to the amount of material inside the microwave applicator. This value also allows for considering fractional number of trays 14 inside the applicator 20. Alternatively, a photoeye can also be used to measure the number of inches of logs 12 entering the applicator 20. Regardless of whether tray inches, log inches or some other loading parameter is used, the value obtained from the sensors is used to give the amount of material inside the applicator 20 and can be modified as desired.

The input variable range is covered by fuzzy sets. One way of doing this is to classify the amount of material input into regions based on the percent of maximum expected amount of material inside the applicator 20. For example, the first region can be amount of material values between 0 and 20% of the maximum expected amount of material; the second region can be amount of material values between 20% and 40% of the maximum expected amount of material; and so on. The weight of the product varies with the product being extruded and can also be divided into fuzzy sets.

Figure 3:
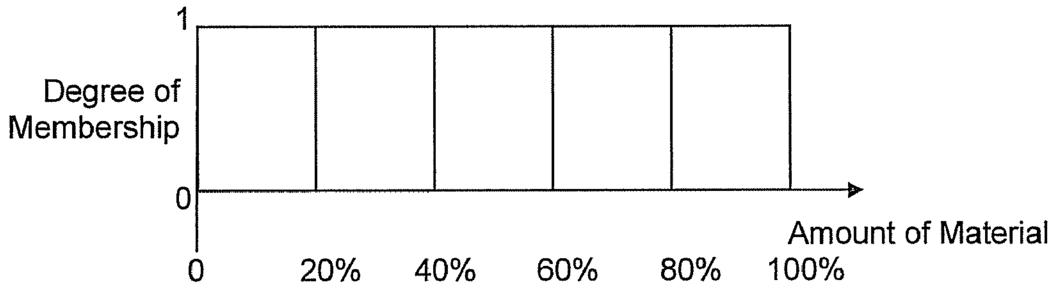
FIG. 3 illustrates an example of a rectangular membership function.

A membership function is selected to cover the range of the input variables. One example is a rectangular membership function as shown in FIG. 3. In this case, the membership function maps the percent of maximum expected amount of material input to either a 0 or 1 for each region depending on whether or not the amount of material value falls within a particular region. In this embodiment, the minimum power setpoint, $P_{MIN}$, is set based on the region of the membership function. Take for example the situation, where the amount of material inside an applicator is determined by measuring the width of the tray. Assume that the maximum expected tray inches is 85 inches and each tray has a width of 17 inches. In this case, there can be a maximum of 5 trays inside an applicator. Dividing the tray inches range into 5 equal sections, provides ranges of 0 to 17 inches, 17+ to 34 inches, 34+ to 51 inches, 51+ to 68 inches and 68+ to 85 inches. If the tray inches inside an applicator was computed to be 45 inches (53%), which is in the third region, then the membership function would return a value of '0' for the first, second, fourth and fifth regions; and a value of '1' for the third region. Thus, the minimum power setpoint will be set to the $P_{MIN}$ value for the third region. Different types of membership functions can also be chosen, such as a trapezoidal or an S-function membership function, to obtain smoother transitions between two consecutive ranges. Similar procedure can also be carried out for the weight of the product being extruded.

Figure 4:
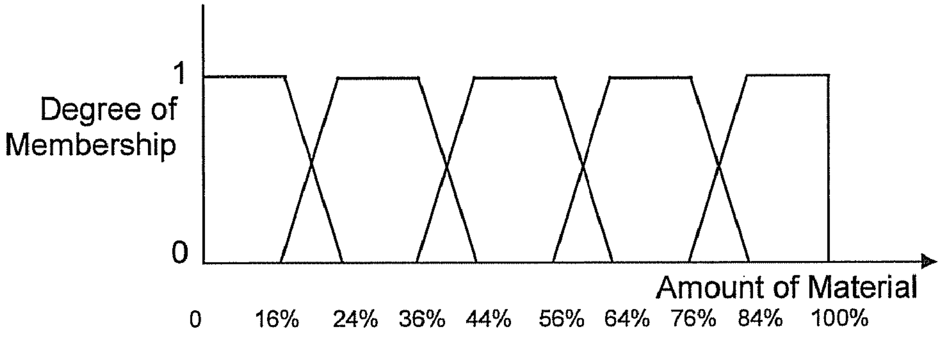
FIG. 4 illustrates an example of a trapezoidal membership function.

FIG. 4 shows an example of a trapezoidal membership function. Based on the amount of material measurement obtained from the photoeye, it can be determined where in FIG. 4, the amount of material measurement falls. If the amount of material measurement falls into any of the non-overlapping portions of a region, then the procedure described in [46] is followed. However, if the amount of material measurement falls somewhere in a transition portion, then a determination is made of how much each region in the transition portion contributes towards the amount of material measurement. For example, if the amount of material measurement is 20% of maximum expected amount of material, then the contribution is 0.5 from the first region and 0.5 from the second region. If P1 corresponds to the minimum power setpoint of the first region and P2 corresponds to the minimum power setpoint of the second region, then the resulting minimum power setpoint output could be computed as $P_{MIN}=(0.5*P1)+(0.5*P2)$. This equation is an example of the defuzzification step, wherein the final output signal is computed that could be sent to the process.

Other factors in addition to the type of membership function can be varied. Some parameters that can be varied include the amount of overlap of the function profiles, the number of ranges for the amount of material variable, and/or the way the final power is computed in the transition regions.

A relation between the input variables and the output variables is determined. In this embodiment, a relationship between the amount of material in the applicator and the product weight to the minimum power setpoint is determined. This can be obtained based on historical data.

For each of the input ranges, power can be computed based on the following relation:

$$P_{OUTPUT}=X_1(M-TI)^2+X_2(M-TI)+X_3 \quad (1)$$

where M is the maximum expected amount of material and TI is the amount of material inside a particular applicator 20. The coefficients $X_1$, $X_2$ and $X_3$ are the elements of the vector X, which is obtained by solving the following set of algebraic equations:

$$AX = B; \tag{2}$$

$$A = \begin{bmatrix} M^2 & M & 1 \\ 0 & 0 & 1 \\ 1 & 1 & 1 \end{bmatrix}; B = \begin{bmatrix} P_{MIN} \\ P_{MAX} \\ \frac{(M-1)}{M} P_{MAX} \end{bmatrix}; X = \begin{bmatrix} X_1 \\ X_2 \\ X_3 \end{bmatrix}$$

where $P_{MIN}$ and $P_{MAX}$ are the minimum and maximum power setpoints for the applicator. In this embodiment, the maximum power setpoint, $P_{MAX}$, is fixed by the operator based on the product being extruded, desired drying characteristics and the operating parameters of the applicator 20, while M is the maximum expected amount of material in the applicator. The minimum power setpoint, $P_{MIN}$, is changed based on the weight of the extrudate for each of the input ranges. The set of equations in (2) are solved to obtain the coefficients $X_1$, $X_2$ and $X_3$. These coefficients are in turn used in equation (1) to compute the output power, $P_{OUTPUT}$.

Note that the inverse of the matrix A always exists as the determinant of the matrix, given by $(-M^2+M)$, and is equal to zero only when M is equal to '0' or '1'. M, defined as the maximum expected amount of material, is never equal to '0' or '1' for the system under consideration. Therefore the matrix A is a non-singular matrix whose inverse always exists. The minimum power setpoint, $P_{MIN}$, in the matrix B of the equations (2) can be computed using the correlation shown in FIG. 5.

FIG. 5 shows a sample plot of two different sets of values collected for some of the different product types. The upper values in FIG. 5 (shown as squares) are the weights for each of the product types. The lower values in FIG. 5 (shown as circles) are the average temperature drops after tray spacing gaps larger than the applicator length for each of the product types. Note that as the weight of the product increases, the temperature drop around large gaps decreases and vice versa.

Figure 6:
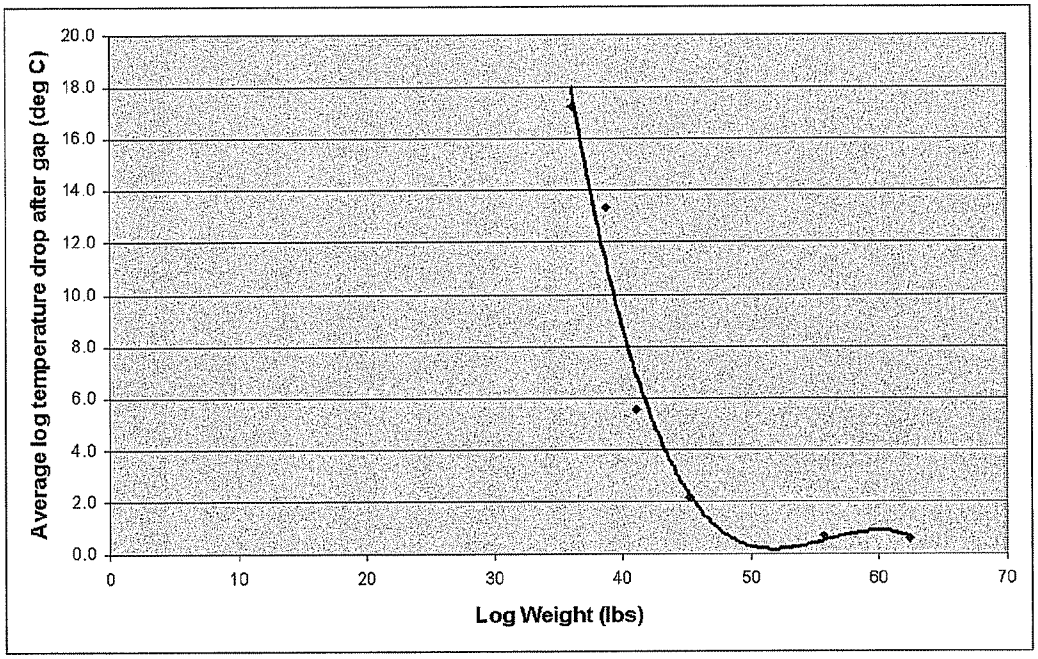
FIG. 6 shows an example of a curve fit of the temperature drop versus weight for several different products when tray spacing gaps are larger than the applicator length.

The data in FIG. 5 can be plotted as shown in FIG. 6 to show the relationship between the log weight and temperature drop for large gaps, and then fitted by a polynomial. In one embodiment, a third order polynomial was selected to fit this data. The polynomial was:

$$\Delta T_{LARGE\_GAP} = A_1 W^3 + A_2 W^2 + A_3 W + A_4 \tag{3}$$

where $\Delta T_{LARGE\_GAP}$ is the drop in log temperature after a large gap, W is log weight and $A_1$, $A_2$, $A_3$, $A_4$ are coefficients of the polynomial. The coefficients for the polynomial fit to the data were computed in this embodiment as:

$A_1 = -0.0038$, $A_2 = 0.6105$, $A_3 = -32.6308$, and $A_4 = 577.1515$.

Equation (3) computes an estimate of the temperature drop, $\Delta T_{LARGE\_GAP}$, for a log that is being extruded after a large gap as a function of the log weight.

The additional power $\Delta P_{LARGE\_GAP}$ that is required to compensate for this temperature drop, can be computed using the relationship:

$$\Delta P_{LARGE\_GAP} = \frac{\Delta T_{LARGE\_GAP}}{T_R^1}, \tag{4}$$

where $T_R^1$ is the amount of temperature rise in a log for a unit change in the output power of the applicator, where $T_R^1$ has units of degrees/kW.

A large gap corresponds to low amount of material inside the applicator 20. Hence, the additional power value, $\Delta P_{LARGE\_GAP}$, computed by equation (4) is used for the first and second regions, 0-20% and 20-40%, of the amount of material membership function.

The $P_{MIN}$ value for the first region (0-20%) is the value that minimizes the following function:

$$J = \lfloor (\max\lfloor \Sigma(P_{P,I} - P_{L,I}) \rfloor_J) - \Delta P_{LARGE\_GAP} \rfloor;$$

$$I = 0\% \text{ to } 40\% \text{ tray inches}; J = 1 \text{ to } I \tag{5}$$

where $P_{P,I}$ is the power computed based on the polynomial relationship shown in equation (1) which is a function of the $P_{MIN}$ value in matrix B of equation (2). $\Delta P_{LARGE\_GAP}$ can be computed by equation (4); and $P_{L,I}$ is the power computed based on the existing power control system. Equation (5) computes the maximum of a summation of the differences between the power computed by the existing power control system and the polynomial relationships across values of $P_{MIN}$ and the amount of material, and then determines the difference between that maximum and the additional power $\Delta P_{LARGE\_GAP}$ to compensate for the temperature drop after a large gap. The value of $P_{MIN}$ that results in the least 'J' is used as the $P_{MIN}$ value for the first region (0-20%).

In this embodiment, the $P_{MIN}$ value for the second region (20-40%) was set equal to 1.2 times the $P_{MIN}$ value for the first region (0-20%). The multiplier of 1.2 was obtained based on a statistical analysis of historical data.

A method similar to that described above was used to determine the $P_{MIN}$ values for the ranges corresponding to smaller gaps. Historical data was collected for smaller gaps (similar to the data shown in FIG. 5) and a curve fit was done (similar to that shown in FIG. 6) to determine the temperature difference as a function of log weight for smaller gaps. The relation describing the log temperature difference as a function of log weight for small gaps was modeled using the following equation:

$$\Delta T_{SMALL\_GAP} = A_1 W^2 + A_2 W + A_3 \tag{6}$$

where $\Delta T_{SMALL\_GAP}$ is the drop in log temperature after a small gap, W is log weight and $A_1$, $A_2$, $A_3$ are coefficients of the fitting polynomial. The coefficients for the polynomial fit to the data were computed in this embodiment as:

$A_1 = 0.003160$, $A_2 = -0.234956$, and $A_3 = -3.050840$.

Equation (6) computes an estimate of the temperature drop, $\Delta T_{SMALL\_GAP}$, for a log that is being extruded after a small gap as a function of the log weight.

The additional power $\Delta P_{SMALL\_GAP}$ that is required to compensate for this temperature difference, can be computed using the relationship:

$$\Delta P_{SMALL\_GAP} = \frac{\Delta T_{SMALL\_GAP}}{T_R^1} \tag{7}$$

A small gap corresponds to a large amount of material inside the applicator 20. Hence, the additional power value, $\Delta P_{SMALL\_GAP}$, computed by equation (7) is used for the fourth and fifth regions, 60-80% and 80-100%, of the amount of material membership function.

The $P_{MIN}$ value for the fourth region (60-80%) is the value that minimizes the following function:

$$J=\lfloor(\max\lfloor\Sigma(P_{P,I}-P_{L,I})\rfloor_J)-\Delta P_{SMALL\_GAP}\rfloor;$$

$$I=60\% \text{ to } 100\% \text{ tray inches}; J=1 \text{ to } I \quad (8)$$

where $P_{P,I}$ is the power computed based on the polynomial relationship shown in equation (1); $P_{L,I}$ can be the power computed based on the existing power control system; and $\Delta P_{SMALL\_GAP}$ is computed by equation (7). As noted above, $P_{P,I}$ is a function of the $P_{MIN}$ value in matrix B of equation (2). Equation (8) computes the maximum of a summation of the differences between the power computed by the existing power control system and the polynomial relationships across values of $P_{MIN}$ and amount of material, and then determines the difference between that maximum and the additional power $\Delta P_{SMALL\_GAP}$ to compensate for the temperature difference after a small gap. The value of $P_{MIN}$ that results in the least "J" is used as the $P_{MIN}$ value for the fourth region (60-80%).

The $P_{MIN}$ value for the fifth region (80-100%) can be set equal to 1.1 times the $P_{MIN}$ value for the fourth region (60-80%). The multiplier of 1.1 was obtained based on a statistical analysis of historical data.

In this embodiment, the $P_{MIN}$ value for the middle range (40-60%) was maintained constant at 6.5 kW, a value obtained from historical data.

Various different parameters in this embodiment can be changed depending on the historical data or other factors. For example, different curve fit functions can be used to fit the temperature difference versus weight curves; the multiplicative factors relating the different regions of the membership function can be varied; and the computations for the minimum power setpoints of the different regions can be varied.

With a $P_{MIN}$ value for each region of the membership function, the control system can be used to adjust the process system. The measurement of the amount of material in the applicator is obtained using the photoeye. Then the membership function is used to determine which region the amount of material measurement falls into. Using the membership function of FIG. 3, the rectangular function, the degree of membership will be equal to 1 for one region and 0 for the other four regions. That is the amount of material measurement will fall into only one region. If using the membership function of FIG. 4, the trapezoidal function, the amount of material measurement could fall into a transitional region and the minimum power setpoint, $P_{MIN}$, would be a sum of the fractional contributions from the two portions of the membership function in the transitional region.

Once the appropriate minimum power setpoint, $P_{MIN}$, is determined using the membership function, the required output power, $P_{OUTPUT}$, is computed by plugging this $P_{MIN}$ value into equations (1) and (2).

Figure 7:
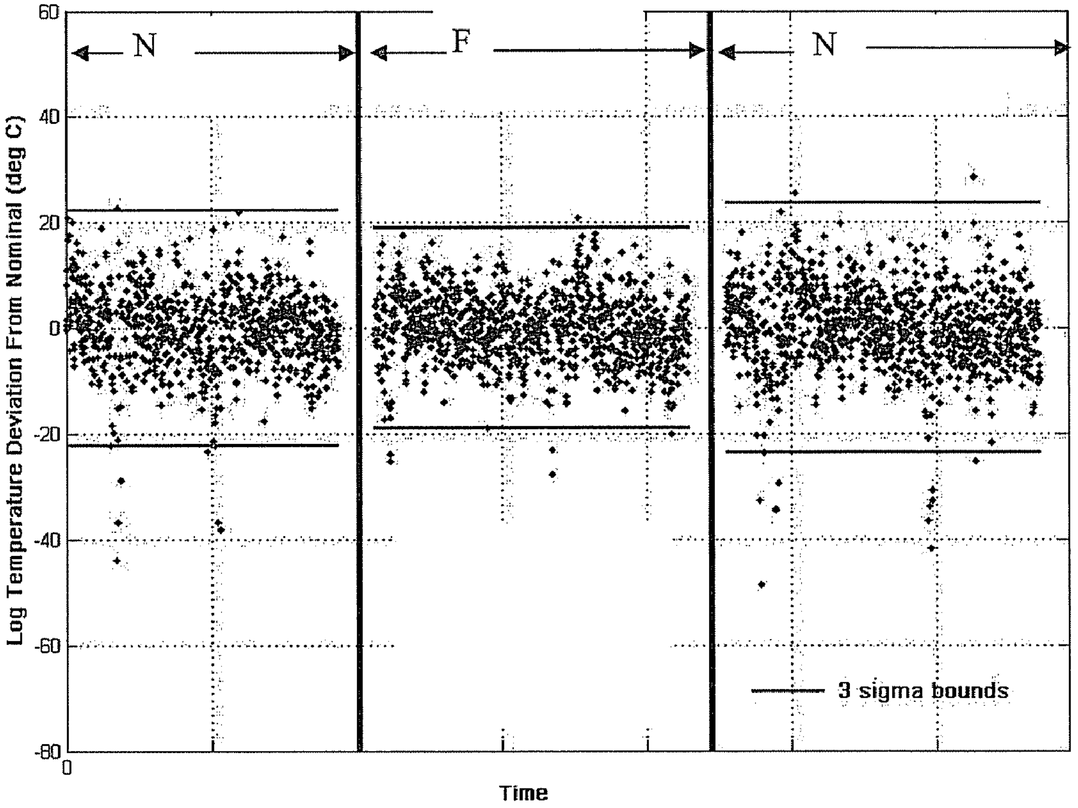
FIG. 7 shows the log temperature deviation for an existing control system and for a fuzzy logic-based control system.

FIG. 7 shows a sample of the results when comparing the performance of the existing (non-fuzzy logic-based control scheme "N") and the fuzzy logic-based "F" control schemes. The fuzzy logic-based control scheme reduces the standard deviation of the log temperature at the end of the drying process by approximately 18%. The fuzzy logic-based control scheme also reduces the number of hot and cold logs that are produced at the end of the drying process. The fuzzy logic-based control scheme reduces the number of hot logs and cold logs by approximately 72% and 82%, respectively. This has a significant impact in the throughput of the system and the number of selects which leads to a reduction in costs.

In a first aspect, a control scheme can be implemented with a Programmable Logic Controller (PLC) corresponding to each dryer with a decentralized control scheme. That is, each dryer has its own dedicated PLC and the control algorithm is incorporated into each of the PLC's, wherein each dryer PLC calculates the required output power of the corresponding dryer based on the operating input conditions. Changes or updates to the decentralized control scheme would generally be effected in all the dryer PLC's in the system. Although an update could be effected during normal production, if the complications arise during the updating process then there is a risk of production downtime until the update is finally implemented, leading to potential loss of revenue. Also, the computation burden on these individual PLC's has to be maintained to a bare minimum so as not to interfere with other functions required of such PLC's, such as process automation functions or data polling.

Figure 8:
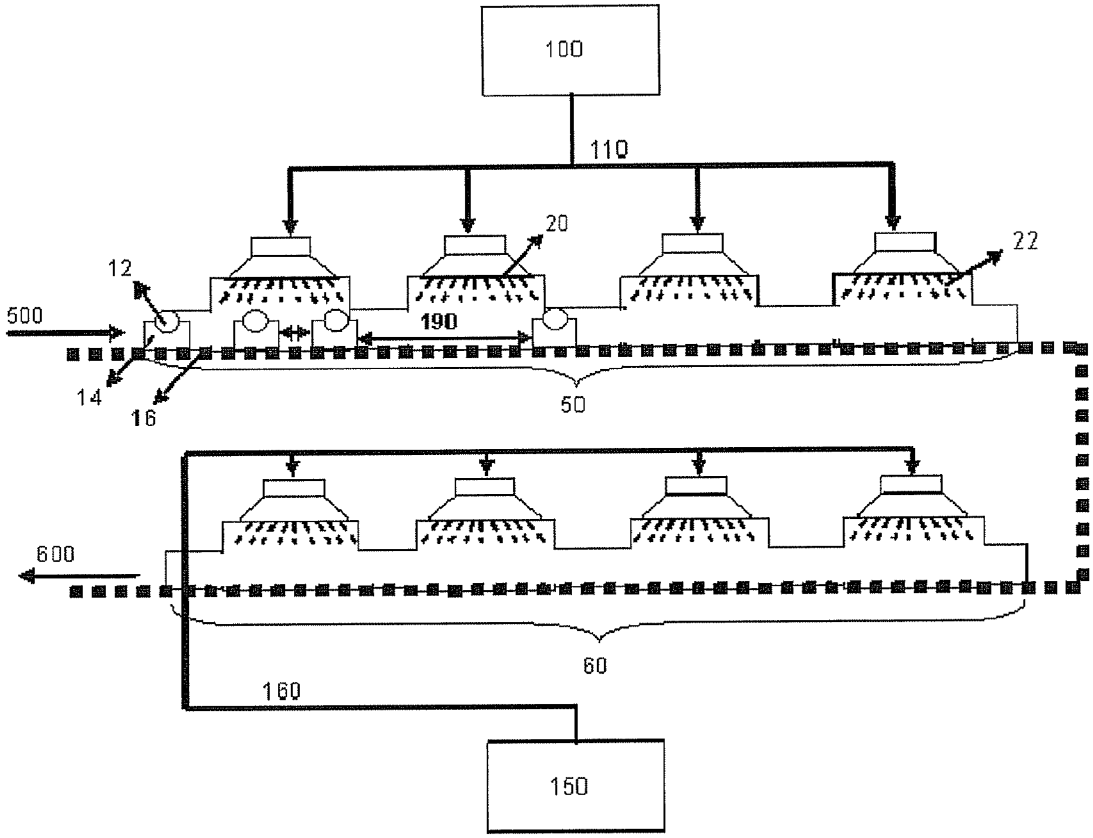
FIG. 8 schematically illustrates the implementation of a decentralized control scheme in a first aspect wherein each dryer has its own dedicated PLC for control.

FIG. 8 shows the schematic of a setup in which a control algorithm is implemented in each of the individual dryer PLC's 100, 150. In this type of implementation or decentralized control architecture, the failure of one PLC will not affect the entire system. However, changes or updates to the existing software/hardware would likely be carried out separately in all the PLC's involved, which could be time consuming and possible prone to error during duplication. A first PLC 100 contains a control algorithm implemented therein, and control signal 110 flows to waveguides 20 in a first dryer 50 which emit microwave energy 22 to expose ware or product 12 resting on trays 14 which in turn rest on a conveyor belt 16. Ware 12 can come directly or indirectly from an extruder apparatus 500. Tray spacing 190 can vary within the same dryer. A second PLC 150 contains a control algorithm implemented therein, and control signal 160 flows to another set of waveguides 20 in a second dryer 60 which emit microwave energy 22 to expose ware or product 12 resting on trays 14 resting on a conveyor belt, wherein the ware in the second dryer 60 comes from the first dryer 50 and exits the second dryer 60 for further processing or storage or packing, as indicated by the path of the dashed line in FIG. 8.

In a second aspect, an alternative to a "decentralized control architecture" is a "centralized control architecture" in which the control algorithm is implemented in a centrally located system that would control all the dryers. This type of implementation can reduce proliferation of bugs/errors during software and hardware updates/changes, can lower maintenance, and can provide only one location for control logic implementation. However, the centralized control architecture may not be suitable for various manufacturing environments because, for example, a failure to the centralized controller could lead to a shutdown of the entire system, leading to loss of revenue.

In a third aspect, control can be effected by implementing a fuzzy logic-based controller (FLC) as a centralized control with decentralized execution architecture. This architecture can include implementing a portion of the control algorithm in a dedicated system that computes the parameters for calculating the control signal to the process. These computed parameters are sent to the individual dryer PLC's in which the remaining portion of the control code is implemented through a network. The dryer PLC's use these computed parameters sent from the dedicated system and compute the required microwave output power (control signals to the process) based on the operating conditions. The dedicated system in which a portion of the control algorithm is implemented is capable of performing complex computations and has hardware and software capable of being connected to a LAN. Some examples include a PLC or a personal computer (PC).

The network through which the parameters from the dedicated system are sent to the individual dryer PLC's, are capable of data exchange and are capable of transferring the data at a desired frequency. The skilled artisan would be able to select a network to provide these capabilities.

Thus, in this third aspect, a method is disclosed implementing FLC as a "centralized control with decentralized execution", in which a portion of the controller code is implemented in a central system and the remaining portion of the controller code is implemented in the individual dryer PLC's that communicate with the central system.

Figure 9:
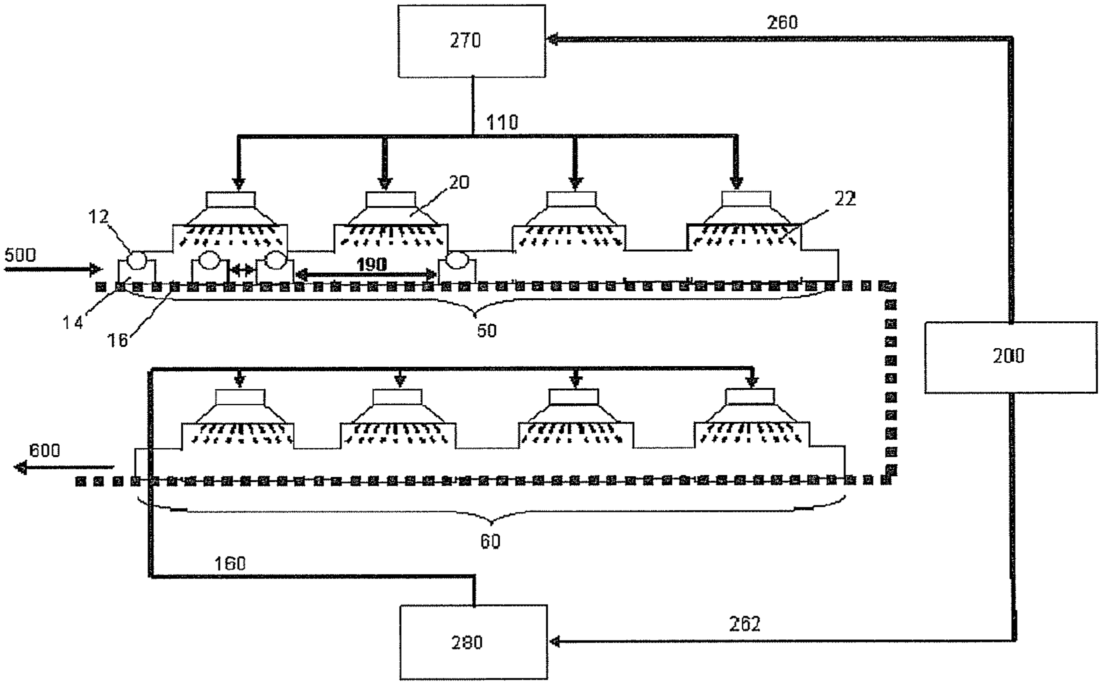
FIG. 9 schematically illustrates the implementation of fuzzy logic-based controller (FLC) in a third aspect as a centralized control with decentralized execution, in which a portion of the controller code is implemented in a central system and the remaining portion of the controller code is implemented in the individual dryer PLC's that communicate with the central system.

FIG. 9 shows a schematic of the type of implementation of the third aspect. A portion of the control code that is computationally intensive (Part A) can be incorporated into the dedicated central system 200 while the less computationally intensive portion of the code (Part B) can be implemented in each of the dryer PLC's 270, 280. Thus, Part A of the control code that resides in the dedicated system 200 can compute the parameters, 260, 262 that Part B of the control code uses to compute the controls signals 110, 160 (e.g., the amount of microwave output power) to the process. Redundancies can be built into the individual dryer PLC's 270, 280 that would then operate as if they were part of a "decentralized control architecture", such as for situations when the dedicated system 200 is down. One such example of a built in redundancy is a switch that would be activated whenever a "break" in the communication link between the dedicated system and the dryer PLC's is determined. The switch can then be used to activate a "default" control algorithm residing in the dryer PLC's to control the drying process, while maintenance personnel are working on restoring the communication link. An alarm can be raised whenever the dedicated system is down so that the maintenance personnel can resolve the issue and bring it back online. When the individual dryer PLC's detect that the dedicated system is back online, they can begin communicating to the dedicated system and revert back to the centralized control with decentralized execution architecture. In this way, a system according to this third aspect can avoid the shut down of the entire system due to the failure of the dedicated system for a centralized control architecture according to the second aspect. Also, the disadvantage of the "decentralized control architecture" of proliferating errors in the control algorithm during duplication can be partially minimized at least for the computationally intensive portion of the control code which is implemented only in one system. Control signal 260 comes from dedicated system 200 and is transmitted to first PLC 270 which contains a Part B control algorithm implemented therein, and control signal 110 flows to waveguides 20 in a first dryer 50 which emit microwave energy 22 to expose ware or product 12 resting on trays 14 which in turn rest on a conveyor belt 16. Ware 12 can come directly or indirectly from an extruder apparatus 500. Tray spacing 190 can vary within the same dryer. Another control signal 262 comes from dedicated system 200 and is transmitted to second PLC 280 which contains a Part B control algorithm implemented therein, and control signal 160 flows to another set of waveguides 20 in a second dryer 60 which emit microwave energy 22 to expose ware or product 12 resting on trays 14 resting on a conveyor belt, wherein the ware in the second dryer 60 comes from the first dryer 50 and exits the second dryer 60 for further processing or storage or packing, as indicated by the path of the dashed line in FIG. 9.

Figure 10:
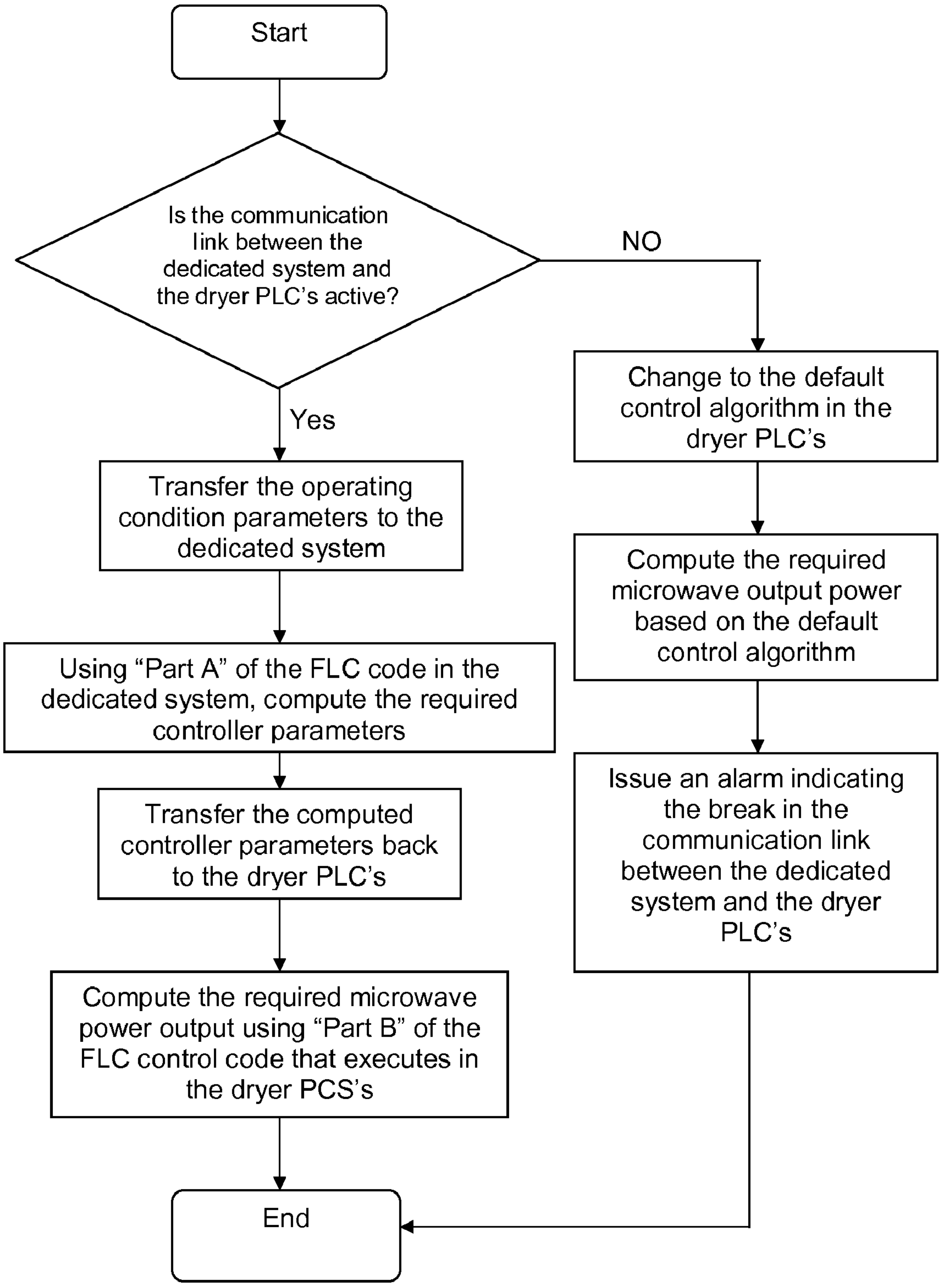
FIG. 10 is a flow chart describing the overall implementation architecture of FLC and outlines the steps of computing the desired microwave output power.

FIG. 10 shows a flow chart describing one embodiment of an overall implementation architecture of FLC and outlining steps of determining or computing the desired microwave output power.

While an exemplary embodiment incorporating the principles of the present invention has been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

We claim:

1. A system for controlling the drying of material by a microwave applicator, the system comprising:

a power output controller that controls the microwave output power of the applicator;

a material sensor that detects the amount of material in the applicator;

a fuzzy logic controller operatively connected to the material sensor and the power output controller, wherein the fuzzy logic controller receives a sensor signal from the material sensor indicating the current amount of material in the applicator and adjusts the microwave output power based on the current amount of material in accordance with fuzzy logic rules by sending a control signal to the power output controller;

and wherein the fuzzy logic controller comprises:

a storage module for storing fuzzy logic information, including a minimum expected value and a maximum expected value for the amount of the material in the applicator which defines an expected range for the amount of material in the applicator, a fuzzification module for storing a membership function that divides the expected range for the amount of material in the applicator into multiple regions, and for each region of the membership function storing a minimum regional value, a maximum regional value and precomputed regional output settings;

a selection module for selecting each region of the membership function including the current amount of material in the range between the minimum regional value and the maximum regional value for that region; and an output processor for computing the control signal based on the precomputed regional output settings of each of the regions of the membership function selected by the selection module, wherein the output processor comprises:

a preselected maximum output power value;

a defuzzification module for calculating a minimum output power value based on the precomputed regional output settings of each region of the membership function selected by the selection module; and a control signal processor calculator for calculating a set of polynomial coefficients based on the maximum output power value and the minimum output power value; and for calculating the control signal based on the set of polynomial coefficients and the current amount of material in the applicator.

2. The system of claim 1 wherein the material sensor comprises a photoeye positioned prior to the entrance of the applicator that detects at least one dimension of the material entering the applicator.

3. The system of claim 2 wherein the material sensor further comprises a weight sensor that detects the weight of the material entering the applicator.

4. The system of claim 1, wherein the regions of the membership function are overlapping.

5. The system of claim 1, wherein the regions of the membership function are non-overlapping.

6. A fuzzy logic-based method of controlling the drying of material by a microwave applicator, the method comprising:

predetermining an expected minimum amount of material in the applicator and an expected maximum amount of material in the applicator which defines an expected range for the amount of material in the applicator;

dividing the expected range for the amount of the material in the applicator into multiple regions using a membership function;

precomputing regional output settings for each of the multiple regions of the membership function;

determining a current amount of material in the applicator;

determining the regions of the membership function that include the current amount of material in the applicator, determining the current output settings based on the regional output settings for each of the regions of the membership function that include the current amount of material in the applicator;

computing a desired output power for the applicator based on the current output settings; and sending a control signal to the microwave controller of the applicator with the desired output power;

wherein the precomputing regional output settings for each of the multiple regions of the membership function step comprises:

precomputing a minimum power setpoint for the applicator for each region of the membership function based on the range of the amount of material covered by that region of the membership function;

precomputing a weight-to-power-difference function relating the weight of the material to a power difference needed to overcome a temperature difference due to a variation in the amount of the material in the microwave applicator; and determining the minimum power setpoint for the microwave applicator using the weight-to-power-difference function.

7. The method of claim 6, wherein the determining a current amount of material step comprises:

sensing a dimension of the material entering the applicator using a dimension sensor positioned prior to the entrance of the applicator; and determining a current amount of material in the applicator based on the sensed dimension of the material entering the applicator.

8. The method of claim 7, wherein the determining a current amount of material step further comprises:

sensing the weight of the material entering the applicator using a weight sensor; and determining a current amount of material in the applicator based on both the dimension and the weight of the material entering the applicator.

9. The method of claim 6, further comprising:

predetermining a maximum power setpoint for the applicator; and wherein the computing a desired output power for the applicator based on the current output settings comprises:

computing a set of polynomial coefficients based on the minimum power setpoint for the applicator and the maximum power setpoint for the applicator; and calculating the desired output power of the applicator using the set of polynomial coefficients.

10. The method of claim 9, wherein the calculating the desired output power of the applicator using the set of polynomial coefficients step comprises:

calculating an independent variable based on the difference between the expected maximum amount of material in the applicator and the current amount of material in the applicator; and calculating the desired output power of the applicator using the independent variable with the set of polynomial coefficients.

11. A fuzzy logic-based method of controlling the drying of material by a microwave applicator, the method comprising:

predetermining a maximum power setpoint for the applicator;

predetermining an expected minimum amount of material in the applicator and an expected maximum amount of material in the applicator, defining an expected range for the amount of material in the applicator;

creating a membership function dividing the expected range for the amount of the material in the applicator into a plurality of regions;

precomputing a regional minimum power setpoint for each of the plurality of regions of the membership function;

determining a current amount of material in the applicator;

determining the regions of the plurality of regions of the membership function that include the current amount of material in the applicator, determining an output minimum power setpoint based on the regional minimum power setpoint for each of the plurality of regions of the membership function that include the current amount of material in the applicator;

computing a desired output power for the applicator based on the output minimum power setpoint and the maximum power setpoint; and sending a control signal to the microwave controller of the applicator with the desired output power;

wherein the computing a desired output power for the applicator step comprises:

computing a set of polynomial coefficients based on the output minimum power setpoint and the maximum power setpoint for the applicator; and calculating the desired output power of the applicator using the set of polynomial coefficients.

12. The method of claim 11, wherein the precomputing a regional minimum power setpoint for each of the plurality of regions of the membership function step comprises:

precomputing a material-to-power-difference function relating the amount of material in the applicator to a power difference needed to overcome a temperature difference due to a variation in the amount of material in the microwave applicator; and determining the regional minimum power setpoint for each of the plurality of regions of the membership function using the material-to-power-difference function.

13. The method of claim 12, wherein the precomputing a material-to-power-difference function step comprises:

precomputing a material-to-power-difference function covering ranges where the amount of material in the applicator is less than or equal to the expected maximum amount of material in the applicator.

14. The method of claim 11, wherein the calculating the desired output power of the applicator using the set of polynomial coefficients step comprises:

calculating an independent variable based on the difference between the expected maximum amount of material in the applicator and the current amount of material in the applicator; and calculating the desired output power of the applicator using the independent variable with the set of polynomial coefficients.

* * * * *